(12) United States Patent
Derrien et al.

(10) Patent No.: US 8,597,073 B2
(45) Date of Patent: Dec. 3, 2013

(54) METHOD AND DEVICE FOR MACHINING THE LEADING EDGE OF A TURBINE ENGINE BLADE

(75) Inventors: Gerard Derrien, Houilles (FR); Claude Leonetti, Courcouronnes (FR)

(73) Assignee: SNECMA, Paris (FR)

( * ) Notice: Subject to any disclaimer, the term of this patent is extended or adjusted under 35 U.S.C. 154(b) by 269 days.

(21) Appl. No.: 13/242,276

(22) Filed: Sep. 23, 2011

(65) Prior Publication Data

US 2012/0077417 A1    Mar. 29, 2012

(30) Foreign Application Priority Data

Sep. 28, 2010   (FR) .................................... 10 57793

(51) Int. Cl.
*B24B 1/00*    (2006.01)
(52) U.S. Cl.
USPC .......... 451/5; 451/6; 451/11; 451/45; 451/65; 451/67; 451/168; 451/331; 451/333; 451/339; 451/456
(58) Field of Classification Search
USPC .............. 451/5, 6, 11, 45, 51, 168, 331, 333, 451/339, 456, 65, 67, 73
See application file for complete search history.

(56) References Cited

U.S. PATENT DOCUMENTS

| | | | |
|---|---|---|---|
| 4,501,095 A * | 2/1985 | Drinkuth et al. ................... | 451/5 |
| 4,566,225 A * | 1/1986 | Bizot et al. .......................... | 451/6 |
| 4,686,796 A * | 8/1987 | Giebmanns ........................ | 451/5 |
| 4,755,952 A | 7/1988 | Johns | |
| 5,193,314 A * | 3/1993 | Wormley et al. ................... | 451/5 |
| 5,245,792 A * | 9/1993 | Liechti et al. ...................... | 451/5 |
| 5,521,847 A | 5/1996 | Ostrowski et al. | |
| 5,645,466 A * | 7/1997 | Wikle ................................ | 451/5 |

(Continued)

FOREIGN PATENT DOCUMENTS

| | | |
|---|---|---|
| EP | 0 199 962 A2 | 12/1986 |
| EP | 2 036 669 A1 | 3/2009 |
| FR | 2 947 197 A1 | 12/2010 |
| WO | WO 2008/001043 A1 | 1/2008 |

OTHER PUBLICATIONS

French Preliminary Search Report and Written Opinion issued May 11, 2011, in French Application No. 1057793, filed Sep. 28, 2010 (with English Translation of Category of Cited Documents).

(Continued)

*Primary Examiner* — George Nguyen
(74) *Attorney, Agent, or Firm* — Oblon, Spivak, McClelland, Maier & Neustadt, L.L.P.

(57) ABSTRACT

A method and a device for machining the leading edge of a turbine engine blade by a machining center for which parameters are set is disclosed. The method includes: acquiring a 3D profile of the leading edge of the blade; calculating at least one characteristic of the leading edge from the 3D profile; comparing the value of the calculated characteristic with a known theoretical value of the characteristic to obtain an elementary difference for the characteristic; calculating at least one undulation of the leading edge between at least two consecutive elementary sections from the 3D profile; optimizing the elementary differences obtained as a function of the undulation; setting the parameters of the machining center as a function of the optimized elementary differences for the elementary sections to define machining passes over the leading edge; and machining the leading edge of the blade with the machining center with parameters set.

12 Claims, 4 Drawing Sheets

(56) References Cited

U.S. PATENT DOCUMENTS

| | | | |
|---|---|---|---|
| 6,217,421 B1* | 4/2001 | McGlasson et al. | 451/47 |
| 6,652,369 B2* | 11/2003 | Jones et al. | 451/365 |
| 6,932,682 B2* | 8/2005 | Kostar et al. | 451/165 |
| 7,118,464 B2* | 10/2006 | Bolz et al. | 451/104 |
| 7,137,869 B2* | 11/2006 | Sattelberger et al. | 451/5 |
| 7,144,302 B2* | 12/2006 | Bolz et al. | 451/36 |
| 7,699,685 B1* | 4/2010 | Gerstner | 451/7 |
| 7,869,896 B2* | 1/2011 | Yamada et al. | 700/164 |
| 2003/0114081 A1* | 6/2003 | Jones et al. | 451/28 |
| 2004/0077293 A1* | 4/2004 | Kostar et al. | 451/36 |
| 2004/0097170 A1* | 5/2004 | Bolz et al. | 451/36 |
| 2005/0106998 A1 | 5/2005 | Lin et al. | |
| 2005/0159840 A1 | 7/2005 | Lin et al. | |
| 2006/0090336 A1 | 5/2006 | Graham et al. | |
| 2006/0223417 A1* | 10/2006 | Sattelberger et al. | 451/5 |
| 2006/0246825 A1* | 11/2006 | Bolz et al. | 451/36 |
| 2006/0258265 A1* | 11/2006 | Moeller et al. | 451/6 |
| 2008/0153390 A1* | 6/2008 | Thompson | 451/5 |
| 2009/0075571 A1 | 3/2009 | Altmann et al. | |
| 2009/0270014 A1* | 10/2009 | Miller et al. | 451/5 |
| 2009/0306930 A1 | 12/2009 | Cameron et al. | |
| 2010/0261411 A1* | 10/2010 | Reinmoeller et al. | 451/5 |

OTHER PUBLICATIONS

Claus Bremer, "Kompressor- und Turbinenschaufeln automatisch reparieren", Werkstatt und Betrieb, vol. 129, No. 7-8, XP000678763, 1996, pp. 672-674.

Fian Gao, et al., "Investigation of a 3D non-contact measurement based blade repair integration system", Aircraft Engineering and Aerospace Technology: An International Journal, vol. 77, No. 1, XP001222981, Jan. 1, 2005, pp. 34-41.

* cited by examiner

METHOD AND DEVICE FOR MACHINING THE LEADING EDGE OF A TURBINE ENGINE BLADE

The invention relates to the field of turbine engine blades and more particularly to the machining of the leading edge of a turbine engine blade.

A turbine engine, such as an aircraft turbojet engine, has different rotors, each comprising a rotor disc on which blades are fixed. A blade is generally elongated in shape and conventionally has a root, forming a first end of the blade, intended to be retained in a slot in the rotor disc provided for this purpose, a free tip, forming a further end of the blade, as well as a leading edge and a trailing edge with profiles which are optimized so as to accelerate a flow of air circulating in the turbine engine from upstream to downstream.

When in use, the blades are subject to wear (erosion, friction) but also to various types of impact resulting in serious damage (tears, burrs, cracks, etc). The leading edge of the blades is then modified, which reduces their aerodynamic performance, in particular in terms of thrust.

As is known, to repair a blade, in particular a fan blade, the damaged part needs to be replaced with an undamaged piece of material or material added to make good the wear. This added material is commonly referred to by a person skilled in the art as a "patch". The patch is welded to the surface of the blade and the latter must be machined to restore its aerodynamic profile. The damaged part is conventionally machined by hand by an experienced operator. The machining of the leading edge of the blade is a particularly delicate operation as the leading edge must be ground whilst observing limitations as to the chord width of the blade at different heights of the blade.

In practice, to remove material from the surface of the leading edge whilst observing the specified chord widths, the operator controls a machining centre which has an abrasive strip intended to come into contact with the leading edge. This operation of machining the leading edge of the blade is known to a person skilled in the art as "profiling". Such a manual method does not guarantee that an optimized leading edge can be obtained.

To repair a damaged part, CAM (computer-assisted manufacture) software is known from patent application FR 2 913 901 filed by the company SNECMA which uses so-called "morphing" functions to set the parameters of a machining centre and automate the repair work. Such software requires that a database of elementary deformations be created in advance and is not suitable for the profiling operation, the purpose of which is to optimize the leading edge and not the whole blade.

In order to eliminate at least some of these disadvantages, the invention relates to a method for machining the leading edge of a turbine engine blade by means of a machining centre for which parameters can be set, the method comprising the following steps:
 acquiring a 3D profile of the leading edge and the trailing edge of the blade, at least two elementary sections being defined on the profile of the blade over its height;
 calculating at least one characteristic of the leading edge from the 3D profile for each of the elementary sections, the said characteristic being chosen from the chord width of the blade, the radius of the leading edge, the pressure-side slope and the suction-side slope of the leading edge;
 for each given elementary section, comparing the value of the calculated characteristic with a known theoretical value of the said characteristic for the said given elementary section so as to obtain an elementary difference for the said characteristic for the said given elementary section;
 setting the parameters of the machining centre as a function of the elementary differences obtained for the said elementary sections in order to define machining passes of the machining centre over the leading edge; and
 machining the leading edge of the blade with the machining centre with parameters set.

According to the invention, characteristics of the leading edge of the blade are calculated precisely using the 3D profile obtained by acquisition. Indeed, it is more advantageous to calculate the different characteristics from the 3D profile than to measure them individually on the blade to be machined. Acquiring the profile of the leading edge and the trailing edge makes it possible to characterize precisely the leading edge of the blade, the trailing edge making it possible to calculate, for example, the chord width of the blade in order to optimize this width so as to increase the lifetime of the blade.

The comparison, for each elementary section, between the calculated value and the theoretical value of a characteristic of the leading edge makes it possible to ascertain the maximum dimension of the leading edge which can be repeated for each of the sections. In other words, the maximum part of the leading edge of the blade which can be machined is extrapolated from the maximum repeat dimensions determined for each given elementary section.

Taken together, the elementary differences obtained for the said elementary sections make it possible to define a corrected profile of the leading edge of the blade which improves its aerodynamic properties. This corrected profile is converted into a parameterization of the machining centre so that, after the leading edge of the blade is machined, the profile of the leading edge of the blade corresponds to the corrected profile. The blade with a machined leading edge then substantially replicates the thrust performance of a new blade.

Such a method makes it possible to guarantee the geometry of the radius of the leading edge section by section, as well as the required thickness of the leading edge independently of the skill of the operators. The method is advantageously repeatable so that the blades can be machined on an industrial scale.

The acquisition of the 3D profile of the blade preferably concerns just the leading edge and the trailing edge of the blade.

The known theoretical value of the said characteristic for a given elementary section is preferably defined as a threshold machining value for the said characteristic. In other words, if the calculated value of the characteristic exceeds the threshold value, the blade must be rejected. By way of example, if the characteristic corresponds to the chord width of the blade, the threshold value corresponds to the minimum thickness of the chord for a given section. If the calculated value of the chord is less than the threshold value, the leading edge cannot be given an aerodynamic profile and the blade must be rejected.

The method preferably also comprises the following steps:
 calculating at least one undulation of the leading edge between at least two elementary sections from the 3D profile;
 optimizing the elementary differences obtained as a function of the said undulation; and
 setting the parameters of the machining centre as a function of the optimized elementary differences for the said elementary sections.

Calculating the undulation of the blade, in other words variation in the profile of the blade over the height of the blade between two elementary sections of the blade, makes it possible to optimize the parameterization of the blade by favouring a corrected profile of the leading edge of the blade for which the undulation is minimal. Such a corrected profile has improved aerodynamic performance. Ascertaining the undulation of the leading edge makes it possible to better characterize the leading edge and hence to set more precise parameters for its machining.

The method preferably has a step in which a 3D profile of the leading edge and the trailing edge of the blade after machining is acquired so that a machining report can be drawn up for an operator. Such a report makes it possible to determine immediately if the leading edge has been correctly profiled.

According to one aspect of the invention, the method comprises a preliminary step in which metal is added to the leading edge of the blade and a preliminary step in which the leading edge to which metal has been added is machined in order to correct any flaws in the material of the leading edge of the blade.

The method preferably comprises a preliminary step in which the porosity of the metal added to the leading edge is analysed. More preferably still, the method has a preliminary step in which the porosity of the leading edge is densified so as to correct the porosities of the leading edge of the blade.

The invention also relates to a device for profiling the leading edge of a turbine engine blade comprising:
a module for acquiring a 3D profile of the leading edge and the trailing edge of the blade, at least two elementary sections being defined on the profile of the blade over its height;
a machining centre for which parameters can be set, having means for driving an abrasive strip intended to come into contact with the leading edge of the blade;
a data processing module designed:
  to calculate from the 3D profile at least one characteristic of the leading edge for each of the elementary sections, the said characteristic being chosen from the chord width of the blade, the radius of the leading edge, the pressure-side slope and the suction-side slope of the leading edge;
  to compare, for each given elementary section, the value of the calculated characteristic with a known theoretical value of the said characteristic for the said given elementary section so as to obtain an elementary difference for the said characteristic for the said given elementary section; and
  to calculate a parameterization of the machining centre as a function of the elementary differences obtained for the said elementary sections in order to define machining passes of the machining centre over the leading edge.

In addition to the advantages already mentioned for the method, the device makes it possible to incorporate various modules so that all of the steps in the method can be performed quickly and in a coordinated fashion.

The device preferably comprises:
a blade loading/unloading module, comprising at least one cradle for receiving a blade, and
a transfer robot designed to move the said cradle between the blade loading/unloading module and the acquisition module.

The loading/unloading module advantageously allows an operator to safely and quickly load blades which are to be machined and to unload blades which have been machined.

To facilitate more particularly the transfer, the machining and the acquisition of the 3D profile of the blade, the blade is mounted in a cradle.

The blade preferably has support means for the blade which are arranged so that they grip one of the ends of the blade, preferably the tip of the blade. The blade is advantageously carried by just one end so that it extends within the cradle without coming into contact with the cradle. The leading edge of the blade and its trailing edge are then directly accessible by the machining centre and/or the acquisition module. The machining and acquisition steps can thus be carried out with the blade remaining in its cradle throughout the method.

According to an aspect of the invention, the loading/unloading module can move between at least:
a rest position in which the cradle is accessible by an operator so that the cradle of the said loading/unloading module can be loaded/unloaded but is not accessible by the robot; and
a working position in which the cradle is accessible by the robot but is not accessible by the operator.

The loading/unloading module advantageously functions as an intermediate unit between the robot and the operator so as to ensure the latter's safety.

The device preferably has a protective enclosure in which at least the acquisition module, the robot, the machining centre and the loading/unloading module are installed, the protective enclosure being partially open in proximity to the loading/unloading module so as to allow an operator situated outside the protective enclosure to load/unload a blade cradle of the loading/unloading module.

According to an aspect of the invention, the acquisition module has:
a sensor for the non-contact 3D acquisition of the profile of the leading edge and the trailing edge of the blade in its cradle; and
means for driving the cradle in rotation with its blade during the acquisition by the acquisition sensor.

The drive means advantageously perform a twin function: they precisely position the cradle relative to the acquisition sensor and rotate the cradle so that the trailing edge and the leading edge of the blade are presented successively to the acquisition sensor.

The acquisition module preferably has means for driving the acquisition sensor in translation over the height of the blade.

The acquisition module preferably has suction means designed for recovering the material machined from the blade. This advantageously makes it possible to carry out the acquisition and the machining when the cradle is positioned in the acquisition module. This is particularly advantageous when a further acquisition of the profile of the leading edge of the blade is performed to check the accuracy of the machining step. Indeed, once the cradle is in position in the acquisition module, the coordinate system for the acquisition and the machining is identical. It is advantageously possible to carry out in succession an acquisition of the profile of the blade to be machined, the machining and a further acquisition of the profile of the machined blade quickly and accurately.

According to a preferred aspect of the invention, the machining centre is in the form of a machining tool intended to be connected to the robot during the machining operation.

According to an aspect of the invention, the profiling device has a metal cladding tool, preferably a cladding laser designed to deposit a layer of metal on the leading edge of the blade.

According to an aspect of the invention, the device has an ultrasound porosity-detection probe designed so that it can be mounted on the robot.

The invention will be better understood with the aid of the following description and the attached drawings, in which.

The invention relates, on the one hand, to a method for machining the leading edge of a turbine engine blade by means of a machining centre for which parameters can be set and, on the other hand, to a machining centre having the said machining centre for which parameters can be set.

The invention will be presented for a fan blade of a turbine engine but applies to any turbine engine blade.

Method for Machining the Leading Edge of a Turbine Engine Blade

The machining method according to the invention, also termed a profiling method, makes it possible to machine the leading edge of a worn turbine engine blade by means of a machining centre for which parameters can be set in order to give it an aerodynamic shape to accelerate and guide the flow of air circulating in the turbine engine.

One step of the method according to the invention consists in carrying out a 3D acquisition of at least the leading edge and the trailing edge of the turbine engine blade. The coordinates of points on at least the leading edge and the trailing edge of the blade are preferably acquired, the points taken together forming a cluster of points. A 3D profile of the leading edge and the trailing edge of the blade is then formed from the cluster of points. This method of acquiring a 3D profile, known to a person skilled in the art, is preferably carried out using non-contact optical measurements, as detailed in the patent application FR 2 940 449 filed by the company SNECMA.

Figure 1:
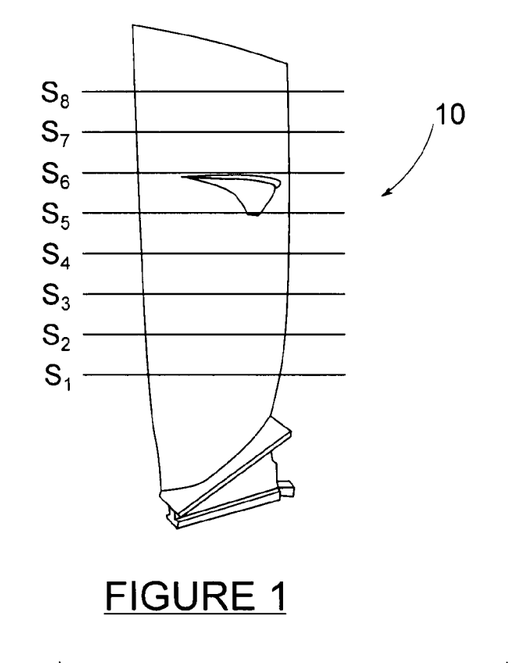
FIG. 1 is a turbine blade to be machined extending vertically heightwise, with horizontal lines shown which represent elementary sections of the blade.

A following step of the method according to the invention consists in slicing the 3D profile obtained over the height of the blade so as to obtain a set of cross-sections which, when stacked one on top of the other, forms the 3D profile. In what follows, each slice is referred to as an elementary section. With reference to FIG. 1 which shows a turbine engine blade 10 extending vertically heightwise, each elementary section has a reference number, the numbers increasing over the height of the blade from its root to its tip. The eight elementary sections S1-S8 referenced in FIG. 1 are given by way of example and it goes without saying that the number of sections and their position could be different.

Figure 2A:
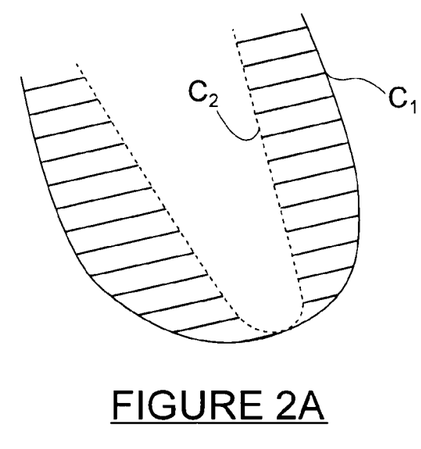
FIG. 2A shows a diagrammatic view of the calculated leading edge and the theoretical leading edge for a given elementary section.
Figure 2B:
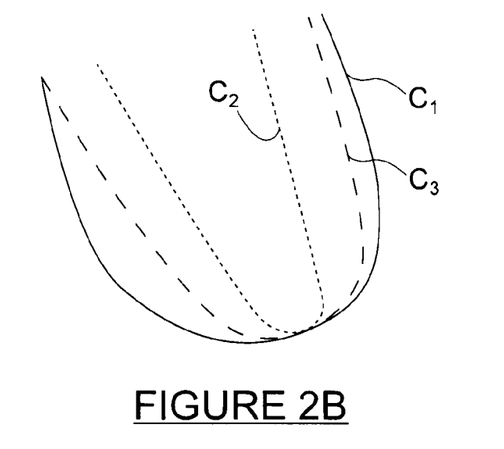
FIG. 2B shows a diagrammatic view of the calculated leading edge and the corrected leading edge after machining for the given elementary section.

The trailing edge BF and the leading edge BA of the 3D profile respectively take the form of curves for each elementary section S1-S8 as shown in FIGS. 2A and 2B. With reference more particularly to FIG. 2A, the solid-line curve C1 represents the leading edge BA after acquisition for a given elementary section, the curve C2 in short broken lines representing the theoretical leading edge for the said given section. The theoretical leading edge defines a machining limit for the said given section and the way in which it is determined is detailed below.

Using the 3D profile of the trailing edge and the leading edge, at least one characteristic of the leading edge is calculated for each of the elementary sections, the said characteristic being chosen from the chord width of the blade, the radius of the leading edge, the pressure-side slope and the suction-side slope of the leading edge.

These characteristics can advantageously be calculated automatically once the 3D profile has been ascertained, which accelerates the method. These characteristics make it possible to characterize precisely the leading edge BA. In this example, only the chord width of the blade is calculated. At least two characteristics are preferably calculated to obtain a high degree of precision. Optimally, all of the characteristics are calculated, i.e. the chord width of the blade, the radius of the leading edge, the pressure-side slope and the suction-side slope of the leading edge.

For each given elementary section, the value of the calculated characteristic is compared with a known theoretical value of the said characteristic for the said given elementary section. In the present case, the calculated chord width is compared with the theoretical chord width of the blade so as to obtain an elementary difference in the chord width for the said given elementary section.

The theoretical value of a characteristic for a given elementary section is defined as a threshold machining value for the said characteristic. In this example, the chord of the blade cannot be machined beyond the said theoretical value. All of the theoretical machining values for all of the elementary sections are defined in charts known to a person skilled in the art and make it possible to define the curve C2 of the theoretical leading edge shown in short broken lines in FIG. 2A.

After the elementary differences of the chord of the blade have been obtained for all of the elementary sections (eight in number here), the maximum dimension of the chord which can be repeated for each of the elementary sections (hatched area in FIG. 2A) is deduced from them. By extrapolation from the maximum repeat dimensions determined for each given elementary section, the maximum part of the leading edge of the blade which can be machined over the entire height of the blade is deduced.

All of the elementary differences taken together make it possible to define a parameterization of the machining centre in which machining passes of the machining centre over the leading edge are determined. By measuring the elementary differences, a corrected profile of the leading edge is deduced which is converted into a parameterization of the machining centre. The trajectories of the machining centre, the machining speed and the forces applied by the machining centre to the leading edge (also called "compliance") are thus determined automatically.

When, for a characteristic of the leading edge, the calculated value exceeds the theoretical threshold value, the blade is considered to be unrepairable and is rejected.

In this example, the machining centre has an abrasive strip which is driven in movement so that it comes into contact with the leading edge. The nature of the adhesive strip (grain shape, grain density, etc) and the speed at which the strip moves are advantageously taken into account in the parameterization. This advantageously makes it possible to determine the quantity of material which will be removed in a pass of the machining centre. The number and the trajectory of the passes over the leading edge during the machining can be optimized, which reduces the duration of the method.

According to an advantageous embodiment of the invention, at least one undulation of the leading edge between at least two consecutive elementary sections is calculated from the 3D profile. Calculating the undulation of the blade, i.e. a variation in the profile of the blade over the height of the blade between at least two elementary sections of the blade, makes it possible to optimize the parameterization of the blade by favouring a corrected profile of the leading edge of the blade for which the undulation is minimal.

The undulation of the leading edge is preferably calculated over the entire height of the blade. Still more preferably, the undulation of the pressure side and/or the suction side of the blade is calculated. The undulation is advantageously calculated automatically from the 3D profile of the blade. The value of the elementary differences is then optimized so as to take into account the calculated undulation or undulations.

Using the calculations made for an elementary section, the leading edge is characterized at a predetermined height. Using the calculation of the undulations, the leading edge is characterized at varying heights, which improves the precision of the parameterization.

When calculating the parameterization for obtaining a corrected profile, a corrected profile is favoured which has few undulations so as to limit the spread of the dimensions of the turbine blades relative to one another. A more uniform shape for the leading edges is thus guaranteed in this way.

All of the optimized elementary differences taken together make it possible to define a precise parameterization of the machining centre, making it possible to give the leading edge of the blade an aerodynamic profile with a small degree of undulation.

Once the parameters of the machining centre have been set, the latter can be activated to profile the leading edge of the blade. Optionally, a finishing machining operation is carried out on the leading profile of the blade by means of a finishing strip such as a "Scotch-Brite" strip known to a person skilled in the art. The finishing machining operation is carried out by the robot using a finishing tool (not shown).

A further 3D acquisition of the profile of the machined blade is preferably carried out so as to check whether a correct profile has resulted from the machining operation.

With reference to FIG. 2B, the solid-line curve C1 shows the leading edge of the blade before machining for the given elementary section, the curve C3 drawn in long broken lines representing the leading edge of the blade after machining. The curve C3 is situated between the theoretical threshold curve C2 and the curve C1 calculated from the 3D profile of the unmachined blade. Indeed, the machining curve optimizes the aerodynamic profile whilst respecting the maximum repeat dimension. An acquisition control report is output for the attention of the operator. In this example, the value of the chord, the radius of the leading edge and the thickness of the leading edge is checked at different distances from the leading edge for a given elementary section.

Using the method according to the invention, in this example the profiling operation is optimized by optimizing the chord to a fine degree, which makes it possible to improve the life of the blade.

According to a preferred embodiment of the invention, prior to the precision machining which allows an aerodynamic shape to be given to the leading edge of the blade so as to accelerate and guide the flow of air circulating in the turbine engine, a preliminary step of cladding the leading edge of the blade is carried out so that any flaws in the metal material of the body of the blade 10 can be made good.

To this end, a first preliminary step consists in carrying out a 3D acquisition of the leading edge as presented above and comparing this 3D profile with a reference 3D profile so as to determine the areas of the leading edge which have a material flaw. Once the areas have been located, a metal cladding step is carried out on the leading edge of the blade 10 in the said located areas by means of a robotized laser designed to spray onto the leading edge a plurality of layers of metal powder in the said located areas.

Once the metal has been added, a further 3D acquisition of the leading edge is carried out and compared with a reference 3D profile so as to determine the areas of the leading edge which have excess material following the cladding. The excess thickness of the leading edge of the blade is machined by means of rotating abrasive strip. Once the thickness of the leading edge has been corrected, the leading edge of the blade can then be subjected to the various precision machining steps so as to give it an optimized aerodynamic shape.

More preferably still, the method has a preliminary step in which the porosity of the added metal on the leading edge BA is analysed. This analysis is preferably performed by non-destructive checking using ultrasound in order to identify and locate the porosities in the added metal. In the course of the analysis, an ultrasound probe is moved close to the surface of the leading edge (0.1 to 0.2 mm), the probe extending perpendicularly to the surface of the leading edge. The ultrasound probe is preferably moved by a robot, as presented below.

In the event of porosities being detected, they are treated by densification. To this end, the blade is placed in an oven and subjected to hot isostatic pressing as presented in the patent application FR 2.953.747 filed by the company SNECMA.

Profiling Device

Figure 3:
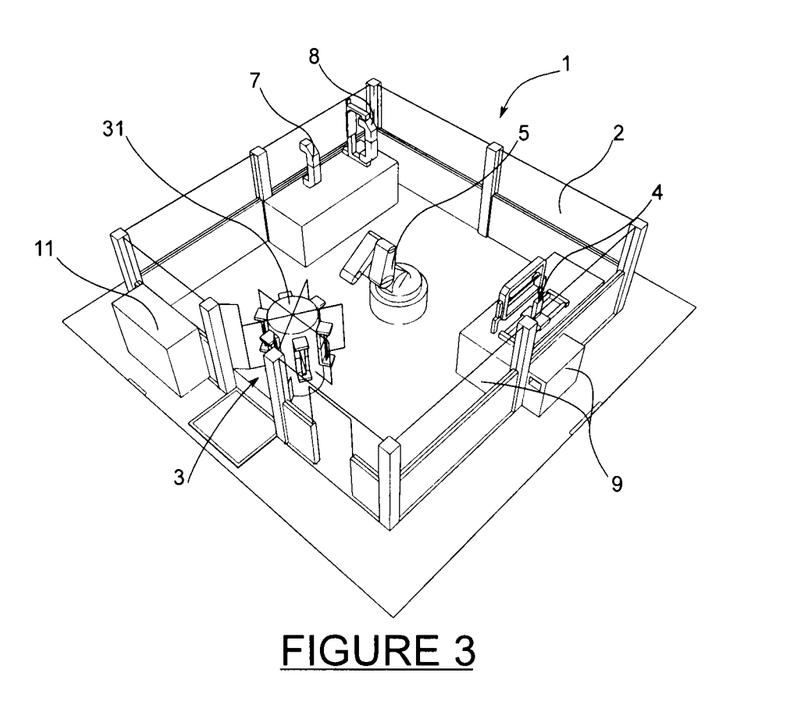
FIG. 3 shows a profiling device according to the invention with various operational modules surrounded by a protective enclosure.

With reference to FIG. 3, the device 1 for machining the leading edge of a blade, also referred to as a profiling device 1, has multiple operational modules surrounded by a protective enclosure 2 consisting of vertical, preferably transparent panels so that an operator can observe the operations carried out by the device in safety.

In this example, the profiling device 1 has a blade loading/unloading module 3, a 3D acquisition module 4 and a robot 5 which is designed, on the one hand, to move a blade from one module to another and, on the other hand, to machine the leading edge BA of the blade 10.

Figure 4:
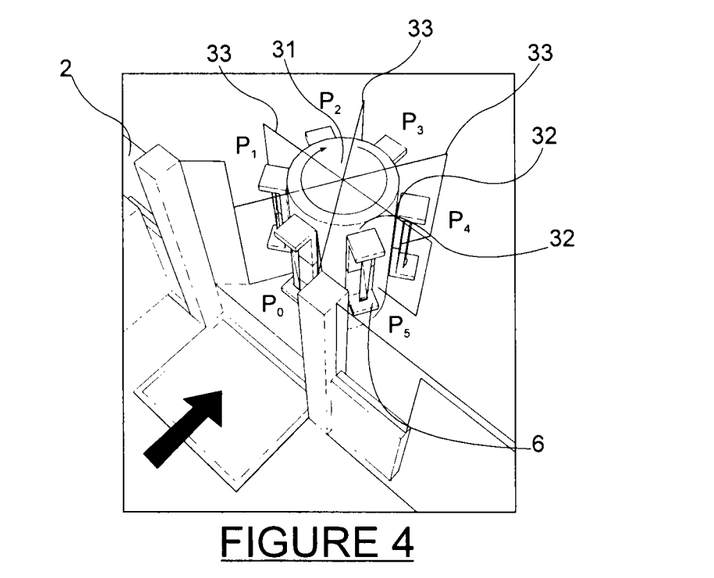
FIG. 4 shows a module for loading/unloading blades to be machined into the profiling device in FIG. 3.
Figure 5:
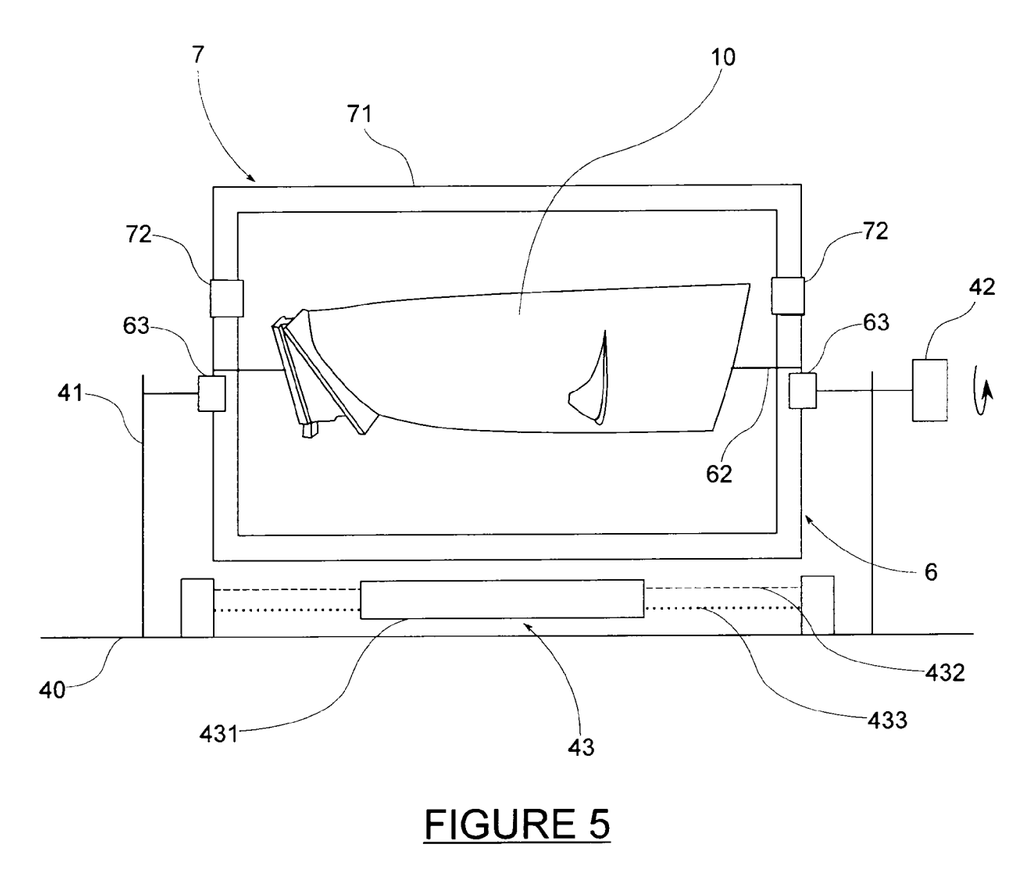
FIG. 5 is a diagrammatic view of a 3D acquisition module of the profiling device in FIG. 3.

So that the blade to be machined can be handled easily in the profiling device 1, it is installed in a cradle 6. As shown in FIGS. 3 to 5, the cradle 6 has a U-shaped frame 61 inside which the blade 10 is installed. In other words, the frame 61 has a base arm and two parallel side arms.

The cradle 6 has means 62 for supporting the blade 10, in this case a gripping jaw 62, extending between the side arms of the frame 61 which is designed to support the blade 10. In the present case, with reference to FIG. 5, the jaw 62 extends from one side arm of the frame 61, perpendicularly to the said side arm and is designed to hold the blade 10 by its tip parallel to the base arm of the frame 61. Once in position in the cradle 6, the position of the blade 10 is perfectly determined, the frame 61 of the cradle 6 forming the coordinate system for the blade 10.

The cradle 6 moreover has link means 63 which are designed to interact, on the one hand, with the robot 5 and, on the other hand, with the blade loading/unloading module 3 and the 3D acquisition module 4.

In the present case, the link means 63 have rods designed to be gripped by pneumatic clamps of the robot 5 or the modules 3, 4. It goes without saying that other link means could also be suitable.

With reference now to FIGS. 3 and 4, the loading/unloading module 3, also referred to as a carrousel, takes the form of a rotating vertical beam 31 having on its lateral surface housings 32 for grasping cradles 6 for blades 10. In the present case, the beam 31 has 6 housings 32 separated from one another by vertical partitions 33 to define six angular positions labelled P0-P5. Each housing 32 has link means, for example pneumatic clamps, designed to interact with the link means 63 of the cradle 6. As shown in FIG. 4, the loading/unloading module 3 has six cradles 6 and is designed to rotate clockwise (indicated by an arrow in FIG. 4) sequentially by angular increments of 60° so as to move the cradle 6 from its initial loading position P0 into a working position P3 (diametrically opposite the position P0) and then back to the initial position P0 so that it can be unloaded.

It goes without saying that the beam 31 could include a different number of housings 32. The greater the number of housings 32, the more standby cradles 6 can be stored in the loading/unloading module 3.

With reference to FIG. 4, the loading/unloading module 3 is placed at the periphery of the device 1 so that the housing 32 in the initial position P0 is accessible for loading/unloading. To this end, the protective enclosure 2 has an opening formed between two panels at the initial position P0. The partitions 33 of the housing 32 in the initial position P0 are arranged so that they correspond with the panels of the protective enclosure 2 so as to protect the operator during the operations of loading/unloading the cradle 6.

With reference now to FIG. 5, the acquisition module 4, shown diagrammatically, has a measuring table 40 on which link means 41, for example pneumatic clamps, are arranged which are designed to interact with the link means 63 of the cradle 6 so as to position the cradle 6 precisely relative to the acquisition module 4. The acquisition module 4 also has drive means 42 designed to rotate the cradle 6 with its blade 10 during the acquisition, as will be detailed below. Once the cradle 6 has been mounted on the acquisition module 4, the blade 10 extends parallel to the plane of the measuring table 40, as shown in FIG. 5.

The acquisition module 4 also has a support 43 for driving an acquisition sensor (not shown), the support 43 comprising a plate 431 mounted so that it can slide on rails 432 integral with the measuring table 40, which is driven by an actuator 433. A 3D optical acquisition sensor, known per se to a person skilled in the art, is preferably mounted on the plate 431 and is driven in translation so as to scan the blade 10 over its entire height. The drive means 42 for the acquisition module 4 drive the cradle 6 in rotation relative to the measuring table 40 so as to present the whole profile of the blade 10 in front of the 3D acquisition sensor. The rotation of the blade 10 combined with the translation of the optical sensor makes it possible to obtain quickly the 3D profile of the trailing edge BF and the leading edge BA.

The data obtained during the acquisition are then transferred to a processing module 11 (shown in FIG. 3), the purpose of which is to control the robot 5. In this example, the processing module 11 is in the form of a computer designed to calculate the parameterization of the robot 5.

The robot 5 is here in the form of a robotized arm 51 designed to be connected to a plurality of tools. In this example, the arm 51 is designed to interact with at least one tool 7 for holding a cradle 6 and one profiling tool 8, each tool 7, 8 having means for attachment to the said arm 51.

The holding tool 7, shown diagrammatically in FIGS. 3 and 5, has a frame 71 in the shape of a U, the base arm of which is designed to be connected to the arm 51 and the side arms of which have link means 72 designed to be connected to the cradle 6 (shown in hatched lines). The link means 72 for the cradle 6 are here in the form of pneumatic clamps but it goes without saying that other means could also be suitable. Once the holding tool 7 has been connected to the cradle 6, the arm 51 of the machining centre 5 can move the cradle 6 from one module to another.

Figure 6:
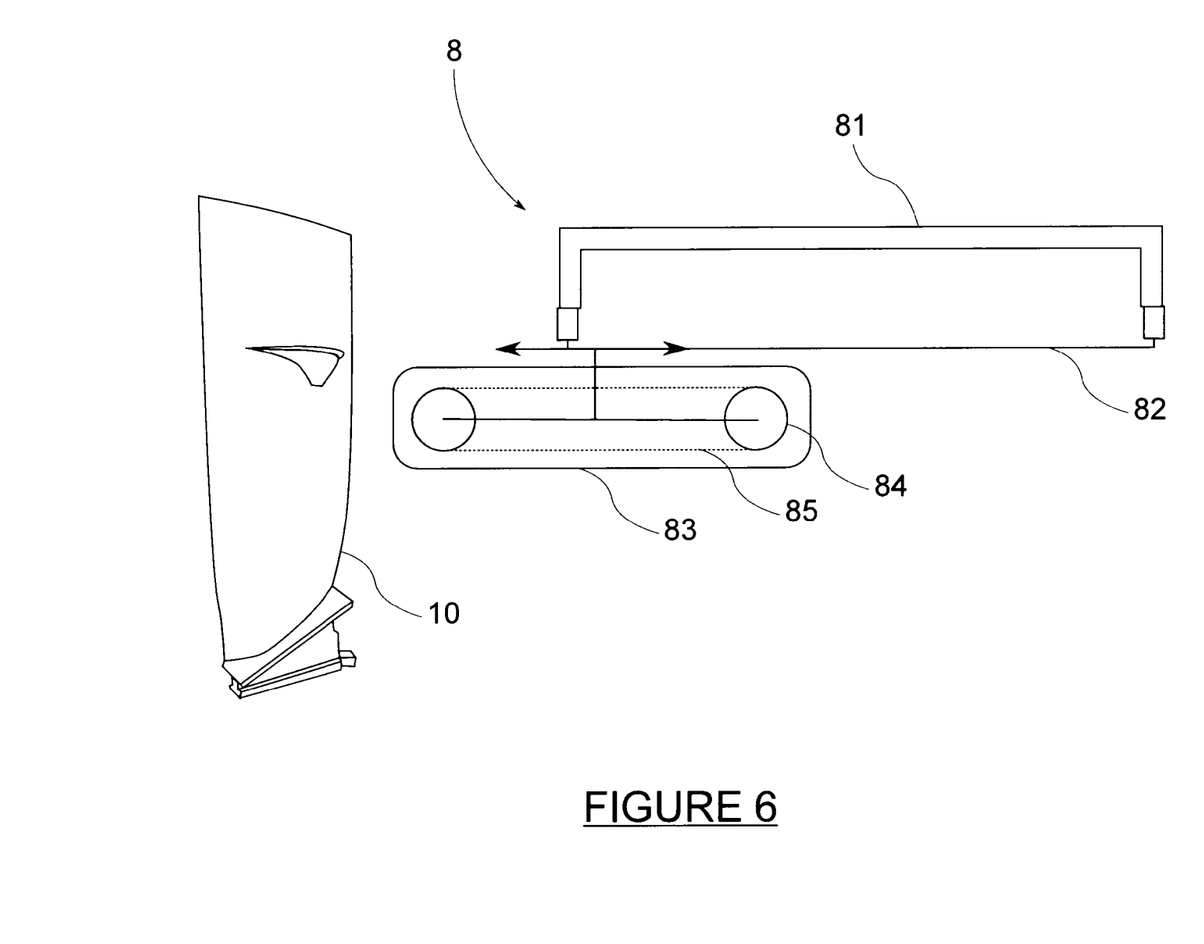
FIG. 6 shows diagrammatically a machining of the blade in the acquisition module of FIG. 5.

The profiling tool 8, shown in FIGS. 3 and 6, has a frame 81 in the shape of a U, the base arm of which is designed to be connected to the arm 51. A rail 82 extends between the side arms parallel to the base arm. A grinding head 83 having an abrasive strip 85 driven in rotation by wheels 84 is mounted on the rails 82 of the profiling tool 8. Thus, when the robotized arm 51 is equipped with the profiling tool 8, the abrasive strip 85 is brought into contact with the surface of the blade 10 which is held in its cradle 6 so as to machine its leading edge BA.

The profiling operation is carried out when the blade 10 is positioned in the acquisition module 4. This is very advantageous as the acquisition of the 3D profile and the profiling are carried out within the same coordinate system. There is thus no need to change the coordinate system, a tedious operation which is prone to error and results in inaccurate machining.

The drive means 42 of the acquisition module 4 preferably drive in rotation the blade 10 and its cradle 6 during the machining to enable the profiling tool 8 to machine the entire surface of the leading edge. The parameterization of the drive means 42 of the cradle 6 is deduced from the parameterization of the robot 5 presented above.

After the 3D profile has been processed by the processing module 11, the latter sends reference variables to the robot 5 to control the profiling tool 8 on the blade 10. In this example, the processing module 11 determines the trajectories of the profiling tools 8 and the renewal speed of the abrasive strip 85 so as to be able to obtain a leading edge BA, the dimensions of which are optimized as detailed above in the presentation of the method.

The precise quantity of material which will be removed from the surface of the leading edge with an abrasive strip which wears at a known rate is preferably determined. This is very advantageous, given that the robot 5 with its profiling tool 8 is parameterized to make several successive passes during which the abrasive strip 85 will become worn. By knowing the quantity of material removed for a given pass as a function of the wear of the abrasive strip, the number of passes is optimized.

The acquisition module 4 preferably has suction means 9 for the machined material of the blade 10 which comprise, in the present case, a suction table equipped with a filter.

To implement the invention, an operator positions a blade 10 in a cradle 6 and then places the latter in the loading/unloading module 3 at the position P0. The beam 31 rotates in a clockwise direction so that it assumes the position P3 in the loading/unloading module 3, and the arm 51 of the robot 5 connects to the cradle 6 by virtue of its holding tool 7 in order to move it into the acquisition module 4. During the acquisition, the cradle 6 is driven in rotation whilst the optical sensor is moved in translation on the rails 432 in order to scan the blade 10 over its height.

After the 3D profile of the trailing edge and the leading edge of the blade are acquired, the processing module 11 parameterizes the robot 5 so as to carry out a profiling of the leading edge BA of the blade 10, improving its aerodynamic performance. The robot 5 is disconnected from the holding tool 7 so it can be connected to the profiling tool 8 to carry out the machining. Optionally, a finishing machining operation of the leading profile of the blade is carried out by means of a finishing strip as indicated above. The machined material is sucked up by the suction means 9 so as to preserve a clean working surface.

The acquisition module 4 carries out a further 3D acquisition of the profile of the machined blade 10 so as to check the profile of the machined blade. This further acquisition is transmitted to the processing module 11 which sends a report on the profiling operation to the operator.

The arm 51 of the machining centre 5 is then connected to the cradle 6 by its holding tool 7 so as to return it into the loading/unloading module 3 in the position P3. After the beam 31 of the loading/unloading module 3 has been rotated, the cradle 6 is unloaded by the operator at the position P0 so that the machined blade 10 can be recovered. By virtue of the profiling device 1 according to the invention, the profiling operations are considerably accelerated, which makes it possible to increase the profiling rate of the blades 10 and increase the precision and overall quality of the profiling.

In order to implement the preliminary steps of cladding the leading edge of the blade, the blade 10 is preferably placed in its cradle 6 which is itself placed in the acquisition module 4 in order to obtain the various 3D acquisitions before and after the cladding. Similarly, the step of machining the excess thickness of the leading edge of the blade following the cladding is performed by the profiling tool 8 which is controlled by the robot 5. The step of the laser cladding is carried out by means of a cladding tool (not shown) which is fixed to the robot, preferably a cladding laser adapted to spray a layer of metal powder onto the leading edge. Thus the blade 10 advantageously remains in its cradle 6 during the step of cladding and profiling its leading edge, which improves safety and increases the pace at which the steps are carried out.

The analysis of the porosity of the added metal on the leading edge is preferably performed by the robot 5 equipped with an ultrasound probe, which guarantees an orientation and a precise positioning of the ultrasound probe relative to the leading edge of the blade 10 during the non-destructive checking process. The blade is preferably mounted in its cradle 6 during the analysis of the porosity. The step in which the porosity of the leading edge is densified is carried out in an oven and requires the blade 10 to be dismounted from its cradle 6. Once the blade 10 has been densified, it is replaced in its cradle 6 so that its leading edge can be precision-machined.

The invention claimed is:

1. Method for machining the leading edge of a turbine engine blade by means of a machining centre for which parameters can be set, the method comprising the following steps:
    acquiring a 3D profile of the leading edge and the trailing edge of the blade, at least two elementary sections being defined on the profile of the blade over its height;
    calculating at least one characteristic of the leading edge from the 3D profile for each of the elementary sections, the said characteristic being chosen from the chord width of the blade, the radius of the leading edge, the pressure-side slope and the suction-side slope of the leading edge;
    for each given elementary section, comparing the value of the calculated characteristic with a known theoretical value of the said characteristic for the said given elementary section so as to obtain an elementary difference for the said characteristic for the said given elementary section;
    calculating at least one undulation of the leading edge between at least two consecutive elementary sections from the 3D profile;
    optimizing the elementary differences obtained as a function of the said undulation;
    setting the parameters of the machining centre as a function of the optimized elementary differences for the said elementary sections in order to define machining passes of the machining centre over the leading edge; and
    machining the leading edge of the blade with the machining centre with parameters set.

2. Machining method according to claim 1, in which the known theoretical value of the said characteristic for a given elementary section is defined as a threshold machining value for the said characteristic.

3. Machining method according to claim 1, comprising a preliminary step in which metal is added to the leading edge of the blade and a preliminary step in which the leading edge to which metal has been added is machined.

4. Machining method according to claim 3, comprising a preliminary step in which the porosity of the metal added to the leading edge is analysed.

5. Machining method according to claim 4, comprising a preliminary step in which the porosity of the leading edge is densified.

6. Device for profiling the leading edge of a turbine engine blade comprising:
    a module for acquiring a 3D profile of the leading edge and the trailing edge of the blade, at least two elementary sections being defined on the profile of the blade over its height;
    a machining centre for which parameters can be set, having means for driving an abrasive strip intended to come into contact with the leading edge of the blade;
    a blade loading/unloading module, comprising at least one cradle for receiving a blade,
    a transfer robot designed to move the said cradle between the blade loading/unloading module and the acquisition module,
    the acquisition module having a sensor for the non-contact 3D acquisition of the profile of the leading edge and the trailing edge of the blade in its cradle and means for driving the cradle in rotation with its blade during the acquisition by the acquisition sensor, and
    a data processing module designed:
        i. to calculate from the 3D profile at least one characteristic of the leading edge for each of the elementary sections, the said characteristic being chosen from the chord width of the blade, the radius of the leading edge, the pressure-side slope and the suction-side slope of the leading edge;
        ii. to compare, for each given elementary section, the value of the calculated characteristic with a known theoretical value of the said characteristic for the said given elementary section so as to obtain an elementary difference for the said characteristic for the said given elementary section; and
        iii. to calculate a parameterization of the machining centre as a function of the elementary differences obtained for the said elementary sections in order to define machining passes of the machining centre over the leading edge.

7. Device according to claim 6, in which the cradle has support means for the blade which are designed to grab one of the ends of the blade, preferably the tip of the blade.

8. Device according to claim 6, in which the loading/unloading module can move between at least:

a rest position in which the cradle is accessible by an operator so that the cradle of the said loading/unloading module can be loaded/unloaded but is not accessible by the robot; and a working position in which the cradle is accessible by the robot but is not accessible by the operator.

9. Device according to claim 6, having a protective enclosure in which at least the acquisition module, the robot, the machining centre and the loading/unloading module are installed, the protective enclosure being partially open in proximity to the loading/unloading module so as to allow an operator situated outside the protective enclosure to load/unload a blade cradle of the loading/unloading module.

10. Device according to claim 6, in which the acquisition module has suction means designed for recovering the material machined from the blade.

11. Device according to claim 6, having a metal cladding tool.

12. Device according to claim 6, having an ultrasound probe for detecting porosities.

* * * * *